US012701201B2

(12) United States Patent
Hartmann et al.

(10) Patent No.: US 12,701,201 B2
(45) Date of Patent: Aug. 4, 2026

(54) ELECTRO-OPTICAL OBSERVATION SYSTEM FOR HUNTING

(71) Applicant: Carl Zeiss AG, Oberkochen (DE)

(72) Inventors: Benedikt Hartmann, Oberkochen (DE); Constantin Klug, Oberkochen (DE); Hexin Wang, Oberkochen (DE)

(73) Assignee: Carl Zeiss AG, Oberkochen (DE)

( * ) Notice: Subject to any disclaimer, the term of this patent is extended or adjusted under 35 U.S.C. 154(b) by 0 days.

(21) Appl. No.: 18/516,876

(22) Filed: Nov. 21, 2023

(65) Prior Publication Data

US 2024/0171708 A1 May 23, 2024

(30) Foreign Application Priority Data

Nov. 21, 2022 (DE) ...................... 10 2022 212 389.1

(51) Int. Cl.
| | |
|---|---|
| *H04N 7/18* | (2006.01) |
| *G06V 20/52* | (2022.01) |
| *G06V 40/10* | (2022.01) |
| *H04N 23/23* | (2023.01) |

(52) U.S. Cl.
CPC .............. *H04N 7/18* (2013.01); *G06V 20/52* (2022.01); *G06V 40/10* (2022.01); *H04N 23/23* (2023.01)

(58) Field of Classification Search
None
See application file for complete search history.

(56) References Cited

U.S. PATENT DOCUMENTS

| | | | |
|---|---|---|---|
| 11,377,028 B2 | 7/2022 | Wieczorek | |
| 2004/0143602 A1* | 7/2004 | Ruiz | G08B 13/122 |
| | | | 348/E7.086 |
| 2009/0314942 A1* | 12/2009 | Vincent | G01N 21/3563 |
| | | | 250/340 |
| 2010/0002224 A1* | 1/2010 | Vincent | G01J 3/0235 |
| | | | 702/19 |
| 2013/0040268 A1 | 2/2013 | Van der Walt et al. | |

(Continued)

FOREIGN PATENT DOCUMENTS

| | | |
|---|---|---|
| DE | 202008013597 U1 | 1/2009 |
| DE | 102019125429 B3 | 12/2020 |
| EP | 1856678 B1 | 1/2015 |

OTHER PUBLICATIONS

Office Action issued in German Patent Application No. DE 10 2022 212 389.1, dated Aug. 31, 2023 (to which this application claims priority) and English language translation thereof.

(Continued)

*Primary Examiner* — Stefan Gadomski
(74) *Attorney, Agent, or Firm* — Ewers IP Law PLLC; Falk Ewers

(57) ABSTRACT

An electro-optical observation system for hunting includes an electronic image detector and an optical unit assigned to the image detector. The observation system further includes a processor configured to indirectly or directly exchange data with the image detector, to analyze an image stream, which was acquired with the image detector, in view of the presence of an object that is sufficiently different from an image background, and to control a user interface to output a notification to a user in the case of the presence detected on the basis of the analysis of the image stream.

12 Claims, 2 Drawing Sheets

(56)          References Cited

U.S. PATENT DOCUMENTS

| | | | | |
|---|---|---|---|---|
| 2014/0259853 | A1* | 9/2014 | Crispin | ................. G02B 23/14 |
| | | | | 42/124 |
| 2014/0323187 | A1 | 10/2014 | Valdez | |
| 2015/0369565 | A1 | 12/2015 | Kepler | |
| 2016/0018628 | A1* | 1/2016 | Rowlette | ............... G02B 21/26 |
| | | | | 359/356 |
| 2017/0109599 | A1* | 4/2017 | Gupta | ................. G06V 10/803 |
| 2017/0205288 | A1* | 7/2017 | Purohit | ................. G08B 13/19 |
| 2018/0039061 | A1 | 2/2018 | Hairston et al. | |
| 2018/0313939 | A1* | 11/2018 | Thomas | .............. G02B 27/142 |
| 2019/0073812 | A1* | 3/2019 | DeBates | .................. G01J 5/12 |
| 2019/0137226 | A1 | 5/2019 | Howard | |
| 2019/0301833 | A1* | 10/2019 | Campbell | .............. F41C 27/00 |
| 2019/0387185 | A1* | 12/2019 | Hicks | ..................... G06V 20/58 |
| 2020/0026058 | A1* | 1/2020 | Maryfield | ......... G02B 26/0891 |
| 2020/0182580 | A1* | 6/2020 | Williams | ............... F41A 27/30 |
| 2020/0193652 | A1* | 6/2020 | Hoffman | ................ G06T 11/00 |
| 2020/0211347 | A1* | 7/2020 | Stewart | ................. G06V 20/52 |
| 2020/0242906 | A1* | 7/2020 | Gali | ........................ G06F 3/167 |
| 2020/0253483 | A1* | 8/2020 | Chase | ................... G06V 40/10 |
| 2021/0241597 | A1* | 8/2021 | Gali | ........................ G10L 17/22 |
| 2021/0244011 | A1* | 8/2021 | Perry | .................. G06V 10/255 |
| 2021/0297035 | A1* | 9/2021 | Thomas | .................... H02J 7/35 |
| 2021/0407262 | A1* | 12/2021 | Farneman | ............. G08B 25/10 |
| 2022/0026557 | A1* | 1/2022 | Arbabian | ............. G01S 13/726 |
| 2023/0097186 | A1* | 3/2023 | Johannesson | ......... B64U 10/70 |
| | | | | 244/108 |

OTHER PUBLICATIONS

Austrian Office Action dated Jul. 21, 2023, of Austrian counterpart application No. 1A A 50123/2023—1, 2 and English Language Machine Translation thereof.

* cited by examiner

ELECTRO-OPTICAL OBSERVATION SYSTEM FOR HUNTING

CROSS REFERENCE TO RELATED APPLICATIONS

This application claims priority to German patent application DE 10 2022 212 389.1, filed Nov. 21, 2022, the entire content of which is incorporated herein by reference.

TECHNICAL FIELD

The disclosure relates to an electro-optical observation system for hunting purposes.

BACKGROUND

Optical observation devices are used for observing nature and animals and (for example also in this context) when hunting. Such observation devices frequently are binoculars or spotting scopes (the latter are commonly also referred to as "telescopes"). The functional scope of electro-optical observation devices is frequently extended to make "phenomena" outside of the visual spectral range or below a brightness required for the human eye accessible to a user. In particular, the display of heat signatures and/or residual light-amplified images should be mentioned in this context, which allow an observation of objects even in the case of darkness (especially subjective darkness). Such functions are usually used in thermal imaging devices or else in night vision devices. Here, usually deviating from purely optical observation devices, the incident radiation is not transmitted optically to a person using the observation device (for short: a user), but indirectly via image converter equipment. Thus, the image observable by the user is usually a display in such cases, the latter being created on account of the incident radiation and usually after processing (image processing) has been implemented.

Such electro-optical observation devices are increasingly used within the scope of hunting as well as, to simplify the observation and monitoring of the intended field of fire, but also to enable a better and more reliable identification of game animals in comparison with purely optical systems. Further, such observation devices can also be used for the retrieval.

SUMMARY

It is an object of the disclosure to provide further assistance within the scope of hunting.

According to the disclosure, the object is achieved by an electro-optical observation system as described herein.

The electro-optical observation system is configured and provided for hunting purposes, which is to say for use when hunting. In this case, the observation system includes an electronic image detector and an optical unit, in particular an imaging optical unit, assigned to the image detector. The image detector and the optical unit are typically arranged in an (observation) device. The observation system further includes a processor configured for indirect or direct data exchange with the image detector. This processor is configured to analyze an image stream, which was acquired with the image detector, in view of the presence of an object, typically a game animal, that is sufficiently different from an image background, and control a user interface to output a notification for a user (referred to below as hunter or using person) in the case of the (recognized) presence.

Thus, the hunter obtains a notification from the observation system, typically in automated fashion, that an object, in particular a game animal, is situated in the currently captured image field. On account of this notification, the hunter can advantageously take their attention from the observation device and/or the image field and thus possibly reduce mental and/or visual exertion (which usually results from a conventional observation of the image field through an optical unit). Thus, the hunter is assisted, and their comfort is increased.

In an exemplary embodiment, the image detector includes pixels arranged in matrix-like fashion for acquiring the image stream. In particular, the image detector in this case includes at least several thousand such pixels, frequently more than 100 000 such pixels.

In an exemplary embodiment, the processor is configured to infer the presence of the object if a movement detected for the object is sufficiently different from an approximately static image background. For example, the processor is configured in this case to perform a threshold value comparison between two successive images. In this case, an appropriately specified threshold value being exceeded allows the inference of an "appearance of a foreign object", which is to say an object not already contained in the image background, in the image field. In this case, "approximately static" is understood here and hereinbelow as meaning in particular that a typical scope of movement for objects belonging to the image background, which is to say for plants in particular, for example a movement of branches or leaves caused by wind, is considered to be sufficiently static as the scope of movement here is regularly lower than in the case of game. In this context, the processor is optionally also configured to additionally detect and consider geometric pieces of information about the object. For example, a branch moving in the wind can be discarded as nonrelevant on the basis of its comparatively narrow spatial (i.e., in the image areal) extent even in the case of a comparatively large movement but standing game may be classified as relevant despite a small scope of movement.

For the above-described movement-based evaluation, the processor is particularly typically configured to apply a (typically fully) trained algorithm (e.g., a neural network, what is known as a "machine learning algorithm", or the like) to the acquired image stream.

The respective algorithm is trained to assign a pattern in the image to an animal, typically on the basis of a plurality of silhouettes and/or thermal image signatures (in particular also moving sequences of these silhouettes or thermal image signatures; and typically also at different distances) of animals. These silhouettes or thermal image signatures (abbreviated: "training images") are contained in a training database (provided centrally in particular, for example at a manufacturer of the observation system) and typically formed by real (thermal image) recordings of these animals. These training images are typically also captured using the same, or at least a comparable, optical unit. Alternatively, a piece of information about the optical unit used to make the recording and/or sensor resolution is attached to the training images such that the algorithm can also learn to use appropriate evaluation parameters for different optical units and sensor resolutions. However, the algorithm is expediently trained for a specific optical unit and sensor resolution.

In an exemplary embodiment, the image detector and the optical unit are part of a thermal imaging device for hunting. In this case, the image detector is configured as a—typically uncooled—microbolometer. In more detail, the image detector contains a matrix (also: array) of a plurality of individual microbolometers (which each form one pixel) (also known as an "infrared focal plane array", "IRFPA"). In this case, the processor is configured to infer the presence of the object if the latter has been assigned (or the processor assigns it) a heat signature typical for a game animal. In a simple variant, the processor uses a typical (body) temperature value for mammals as typical heat signature and performs a threshold value comparison in this respect. In a developed variant, the processor is optionally configured to determine a piece of size information about the object and/or outlines of the object and combine these with the temperature information, and to output the notification if, for example, the size information of the heat signature and the temperature value assigned thereto correspond to a specified value. A trained algorithm is typically also used here; it is trained to infer the presence of an object, in particular a game animal, on the basis of a heat signature. In this case, this algorithm is typically also trained, as described above, on the basis of a training database containing real and/or optionally also virtually generated (thermal image) recordings (optionally also moving sequences) of objects that do not belong to the surroundings, in particular of game animals. This may optionally also be the aforementioned training database with the training images.

Alternatively, the image detector and the optical unit may also be part of a night vision device (in particular configured and provided for use in hunting) (commonly also referred to as a low-light amplifier). In this case, the processor is configured to carry out an image evaluation, typically with a trained algorithm for detecting the object that does not belong to the image background.

In an exemplary embodiment, the processor is configured to determine a piece of information about the localization of the object within the image field, and output this within the scope of the notification. For example, this information is output by virtue of the processor placing a marker, for example a type of "box", on or around the region of the displayed image containing the object, in particular the game animal, over a display of the acquired image stream.

The trained algorithm respectively described above forms a detection algorithm in particular, which is configured to not only detect the presence of the object or game animal per se but also the localization of the latter in the respective image or the image stream. For example, this is implemented by segmenting the respective image to be evaluated. Such a detection algorithm regularly places a "result box" about the target of the analysis.

In an exemplary embodiment, the processor is configured to perform an identification of the object. Typically, the processor is thus configured to recognize the type of detected game animal, which is to say for example deer, wild boar, hare, stag, or the like. For the hunter, this may mean reduced effort and in particular also time saved.

In this case, the processor is typically configured to perform the identification with a pattern comparison or, particularly typically, with a trained algorithm, for example within the scope of the aforementioned detection algorithm. However, alternatively, a classification algorithm specific to the identification may also be executed, the latter having been fully trained on the basis of a (training) database of wild animal images. For example, this training database contains (cf. also the description above) a plurality of wild animal images (typically in thermal image rendering), in particular also from different directions, perspectives, and/or distances. In this case, such a classification algorithm regularly exhibits the advantage of providing a result significantly faster than a conventional pattern comparison, in which an image database must initially be searched through "live". Moreover, this image database must be kept available, either externally, requiring a data connection, or internally, entailing a significant storage requirement. By contrast, the trained algorithm is comparatively trim (i.e., small in relation to the storage requirement). For example, a convolutional neural network (CNN) algorithm is used as such a classification algorithm.

Expediently, the processor is also configured to output a piece of information about the identity of the object, which is to say the type of game animal in particular, within the scope of the notification. In this context, it is also possible as a matter of principle for a plurality of results to be output here too with associated probability values, for example 70% fox, 30% badger, or the like. Typically, this information is output on the part of the processor in connection with the information about the localization of the object.

According to an expedient development, the processor is configured to control the user interface to output the notification to the user only if the object corresponds to a type of objects, in particular a type of game, specified by the user. That is to say that the processor transmits the notification about the presence of the object, in particular of the game animal, to the user interface for output only if this is the "correct" game animal. For example, the hunter can provide information—typically with the user interface—about the type of game which should be reported—or conversely, what type of game should not be reported. For example, the hunter can thus specify that only hoofed game, roe deer, or wild boars should be reported (also in combination, also with other types of game typically hunted). Alternatively, the hunter may also specify that roe deer should not be reported—for example on account of exclusion times or the like. Further optionally, the processor may also offer the option, or this may also be stored as a type of basic setting that non-game animal (e.g., songbirds, cats, dogs, etc.) is not reported, but only animals relevant to hunting. This helps with avoiding irrelevant notifications of animals in general, expressed differently, "false alarms".

In an exemplary embodiment, at least one of the aforementioned algorithms, which is to say the detection algorithm and/or the classification algorithm, for example, is trained in advance but also configured for further training during the use by the hunter. By way of example, the respective algorithm is configured to obtain feedback from the hunter following the detection of a game animal and/or the identification thereof. For example, the hunter is offered to confirm whether the reported object was a game animal and/or whether the identification was correct. Then, a correction of the learned parameters, a confirmation of these parameters, or the like can be performed on the basis of the response. In this context, the training database, a copy thereof, or the like may optionally also be stored in a memory assigned to the processor, the captured image together with the response (e.g., image and "this is not a roe deer" or image and "this is in fact a wild boar") being incorporated in said memory and said memory being used for continuous (additional) learning or further training.

In an exemplary embodiment, the processor, optionally also the user interface, is part of the device including the image detector and the optical unit, which is to say, in particular, of the above-described thermal imaging or night vision device for hunting. In this case, the processor is understood in the present context as being configured directly for data exchange with the image detector.

In an exemplary embodiment, the processor and/or the user interface are part of a smart mobile device, for example a smartphone, a tablet, or else a smartwatch. During intended operation, this mobile device is data-connected (in particular indirectly data-connected) to the device including the image detector and the optical unit, in particular to the thermal imaging or night vision device for hunting. The mobile device is typically coupled wirelessly, which is to say by radio in particular, to the device. However, a wired connection is also conceivable as a matter of principle. This exemplary embodiment of the processor has a number of advantages. Thus, modern smartphones and tablets in particular frequently contain microprocessors which are already configured, or at least prepared, for executing machine learning algorithms, or at least have sufficient computational power for an execution of the algorithm or the respective algorithm running at least approximately in real time. Moreover, such a physical separation of image capture (thermal imaging or night vision device for hunting) and evaluation (smart mobile device) allows the set-up of the image capture device spatially at a distance from the hunter (for example, on a tripod next to or in the further surroundings of the hunter, for example on the roof of a raised hide for a better overview, etc.) and nonetheless allows the obtainment of the pieces of information acquired with the observation device.

Typically, the smart mobile device is configured to display the acquired image stream live via a display (which forms the user interface), in particular with an assigned software application, which also contains the instructions for evaluating the image stream for the processor. Expressed differently, the observation system is configured (but formed separately therefrom) to stream the acquired image stream, also to display this to the hunter, from the observation device (i.e., the thermal image or night vision device for hunting) to the mobile device.

In an optional variant, the observation system includes at least one additional sensor, which is configured to acquire a measured quantity indicating the presence of a game animal representing the object. During intended operation, this additional sensor is typically configured in this case to transmit the measured quantity or an activation signal based on the measured quantity to the processor and/or to the (observation) device including the image detector and the optical unit, in order thus to activate the analysis of the image stream by the processor. Optionally, the observation device is configured to also acquire the image stream only after reception of the measured quantity or the activation signal. For example, the additional sensor can be a comparatively simple motion sensor, for example a PIR sensor, a microphone (for detecting wild animal noises) or the like. Optionally, the additional sensor may also be combined with a (for example satellite-assisted) positioning system. The additional sensor is typically set up in the terrain to be monitored by the hunter. This exemplary embodiment may contribute to the recognition sensitivity of the observation system and/or to the conservation of energy.

In an exemplary embodiment, the optical unit assigned to the image detector is in the form of a wide-field optical unit ("wide-field optics" or "wide-field lens"). This allows monitoring of an image field that is as large (in particular as wide) as possible.

In an exemplary embodiment, the optical unit assigned to the image detector and the image detector are matched to one another in such a way that, in the case of an image depth corresponding to a typical range during hunting, an image with structures that are optically distinguishable in respect of usual game animals to be hunted is imaged on the image detector (8). That is to say, a distinguishability that is sufficient optically in respect of usual game animals to be hunted is made possible. Expressed differently, the optical unit is expediently chosen such that, at the typical range during hunting, objects (in particular game animals) usually located optically in the region of interest of the hunter are resolvable and, at least by the hunter and/or the processor (i.e., typically by the corresponding algorithm), distinguishable. Here and hereinbelow, "typical range during hunting" is understood as meaning in particular a distance of up to 300 meters, but more particularly usually more than 30 but less than 150 meters. In Europe, typical shooting distances during hunting are usually only between 50 and 100 meters. However, it is also advantageous if the image field of the optical unit enables a sufficient resolution at an image depth of for example 300 meters (+/−100 meters). This is because the presence of the object, in particular of the game animal, can also be displayed (reported) to the hunter already outside of the typical range in this case, with the result that the hunter firstly has time to prepare a shot, but secondly also has time to observe the behavior of the game animal. However, it is also conceivable as a matter of principle here that, in the case of an insufficient distinguishability between different game animals, for example outside of (within the meaning of greater than) the typical range during hunting, the hunter is reported the notification about the presence of an object such that the hunter can observe and optionally identify this object themselves and plan the further procedure.

In particular, to set the aforementioned resolution quality (i.e., the distinguishability of correspondingly relevant structures in the image; branches with a thickness of less than 3 centimeters are usually of less interest here, but a game animal body with a width of more than 10 centimeters is of interest), the field of view (also abbreviated "FOV"; aperture angle) of the optical unit, influenced inter alia by the aperture and/or focal length thereof, is matched to a resolution (pixel number, typically specified in lines and columns) of the image detector. Thus, an image detector with a comparatively small number of pixels requires a comparatively narrow field of view in order to enable a sufficient distinguishability at 100 or 150 meters, for example. By contrast, for the same resolution at a given distance, a "larger" image detector, which is to say an image detector with a greater number of pixels, can be used with an optical unit with a larger field of view. Or (correspondingly conversely), in the case of an optical unit with a small (narrow) field of view, this larger image detector enables a sufficiently high resolution even at a greater distance than the "smaller" image detector.

In a further exemplary embodiment, the observation system includes a support platform for mounting the device including the image detector and the optical unit. In this case, this support platform is configured, during intended operation, to impress a panning movement on the (observation) device, typically under processor control, in order to be able to analyze a region of interest going beyond the image field of the optical unit (an enlarged region of interest) in respect of the presence of the object. Expressed differently, the support platform serves for actively scanning the surroundings within the enlarged region of interest. For example, the support platform is a tripod with a tripod head that is movable by an (electric) motor, or a comparable device. Optionally, the support platform may also be formed by a drone carrying the observation device (the thermal imaging device for hunting or the night vision device), with the result that the region of interest can be monitored particularly flexibly from the air.

In an exemplary embodiment, the processor is configured to acquire a piece of information about a shot at the object (which shot is or was taken by the hunter) and track a possible movement of the object, at least within the image field (or else within the enlarged region of interest in the case of the movable mount), and output this as a retrieval notification. For example, a directional specification, for example a directional arrow, or else a course of the path used by the fleeing game animal can be displayed as retrieval notification, for example by way of the user interface. In a variant, the shot can be detected by a microphone, in particular of the smart mobile device. Likewise, however, the hunter may also mark on the user interface, in particular on the display of the mobile device, the game animal intended to be shot, for example by virtue of the hunter tapping said user interface (in the case of a touch-sensitive display). The processor "remembers" the marked game animal and "tracks" the latter, especially after the shot was registered acoustically. In this case, "tracking" is also in particular understood to mean that the optionally used support platform is controlled to keep the fleeing game animal in the image field.

In particular, the conjunction "and/or" should be understood here and hereinbelow to mean that the features linked with this conjunction may be formed both jointly and also as alternatives to one another.

BRIEF DESCRIPTION OF THE DRAWINGS

The disclosure will now be described with reference to the drawings wherein.

DESCRIPTION OF EXEMPLARY EMBODIMENTS

Parts that correspond to one another are always denoted by the same reference signs throughout the figures.

Figure 1:
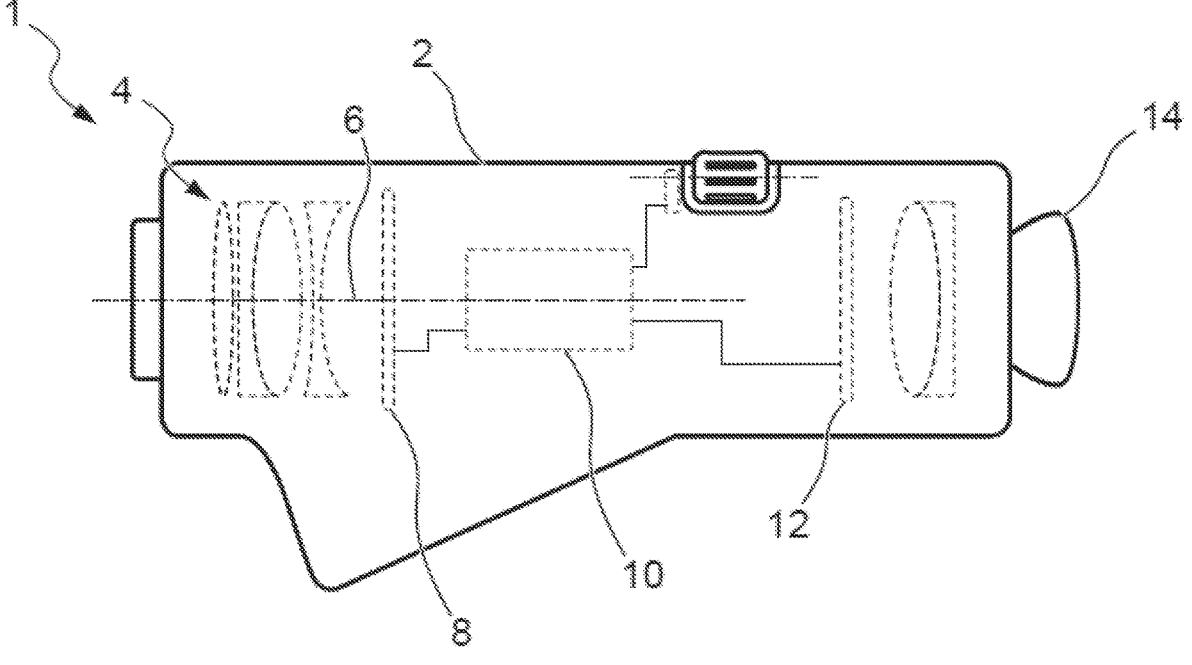
FIG. 1 shows an electro-optical observation device in a schematic side view.

FIG. 1 schematically illustrates an electro-optical observation device, specifically here a thermal imaging spotting scope (for short: thermal imaging device 1). The thermal imaging device 1 includes a device housing (for short: housing 2) that can be held in one hand. An entrance-side optical unit 4 (formed by a lens group with a plurality of individual lenses) and following this, in a "transillumination direction 6", an image detector 8 (in the form of a microbolometer array) are arranged in the housing 2. The image detector 8 is coupled to a controller 10 which is configured to generate an image from the signals of the image detector 8 and, in the case of continuously acquired images, an image stream. On the output side, the controller 10 is coupled to an image display unit, here in the form of an internal display 12. Moreover, the thermal imaging device 1 includes an eyepiece 14, through which a user can observe the processed and displayed image.

Figure 2:
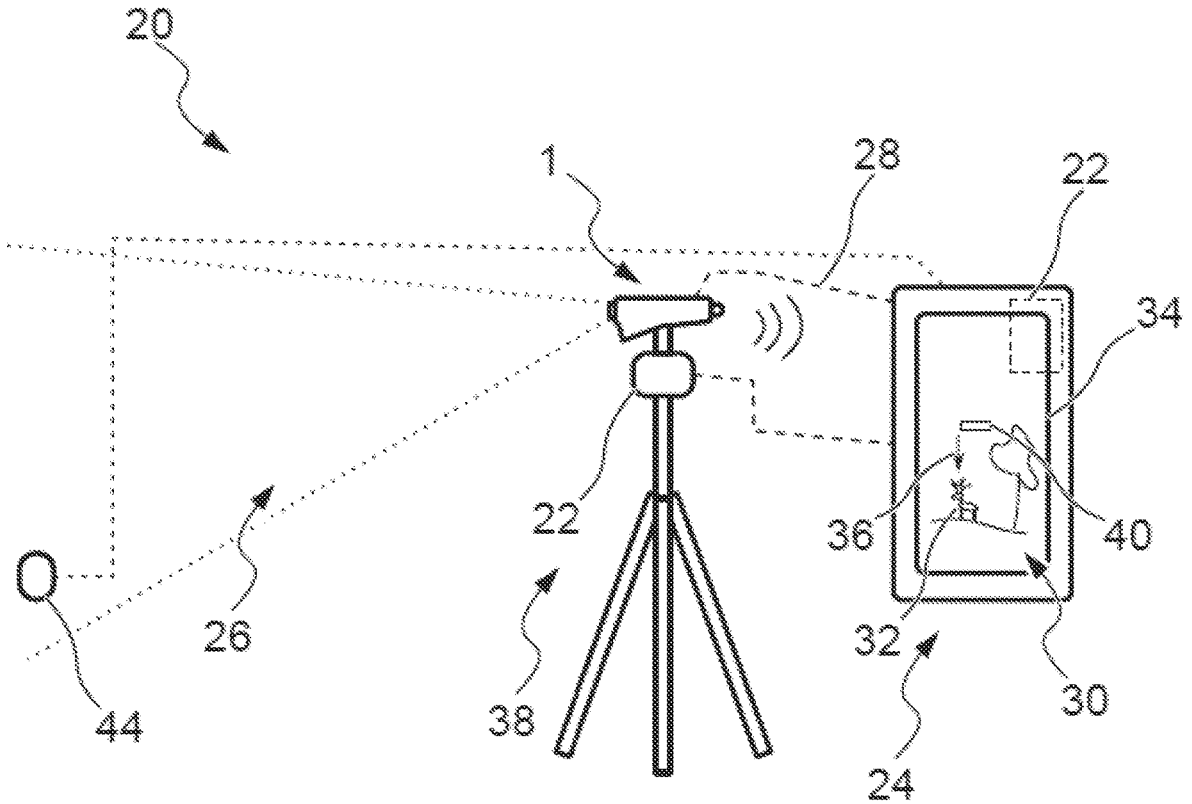
FIG. 2 shows a schematic illustration of an observation system comprising the observation device.

The thermal imaging device 1 is part of an electro-optical observation system 20, which is depicted in more detail in FIG. 2. In addition to the thermal imaging device 1, the observation system 20 includes a processor 22, which is part of a smart mobile device, specifically of a smartphone 24, in the present exemplary embodiment. With a software application, the processor 22 is configured to perform an evaluation described in more detail hereinbelow. Thus, specifically, the smartphone 24 and its processor 22 are part of the observation system 20 while the software application is executed.

The observation system 20 is configured to assist a user, specifically in this case a person hunting (also: hunter) with finding a game animal. To this end, the observation system 20 is configured in principle to capture, with the thermal imaging device 1, an image field 26 (also: field of view), indicated by dotted lines plotted as emanating from the optical unit 4 of the thermal imaging device 1, in the aforementioned image stream and to stream the latter to the smartphone 24, which is to say transmit this image stream with a data transmission connection, in this case a radio connection 28. With the software application executed on the smartphone 24, specifically on the processor 22 thereof, the processor 22 analyzes the image stream (specifically each image 30 of the image stream) in respect of the presence of an object, which is to say a game animal 32 in this case. To this end, the processor 22 determines whether there is a heat signature which is sufficiently different from an image background, for example a meadow and a tree (see FIG. 2; image 30 depicted on a display 34 of the smartphone 24), which is to say whether there is a sufficiently large temperature difference, for example at least 15 kelvins. Optionally, the processor 22 additionally also checks whether a movement is also recognized for this heat signature, for example between a plurality of individual images of the image stream and optionally also in comparison with the image background. If such a heat signature and optionally also the movement are present, the processor infers the presence of the game animal 32 in the image field 26. The processor 22 outputs this "event" via the display 34 with a notification. Optionally, this notification may also be assisted by an acoustic signal. In this case, the image stream is displayed almost live (apart from delays caused by the transmission) on the display 34 (which represents a user interface and also has a touch-sensitive design) and the notification is optionally superimposed.

In order to be able to cover a sufficiently deep observation range, the optical unit 4 and also the image detector 8 are designed such that structures which indicate the presence of game animals can also be resolved by the image detector 8 at a distance of at least a typical shooting distance during hunting, in this case at least approximately 100 meters. However, in the present case this distance is chosen for 200 meters, in order also to be able to scout game (for hunting) which is not yet in shooting distance but approaching.

The above-described analysis is performed by the processor 22 with a fully trained detection algorithm (i.e., a machine learning algorithm). The latter also specifies the position of the game animal 32 in the image 30, for example with a marker 36—in this case an arrow—which is part of the aforementioned notification.

In a simple exemplary embodiment, the person sets up the thermal imaging device 1 on the deer stand (not illustrated) with a tripod 38 and aligns the thermal imaging device 1 with the intended observation region. Subsequently, the person activates the thermal imaging device 1 and the software application on the smartphone 24. Subsequently, the person can wait comparatively effortlessly, since visual monitoring of the observation region is not required, until the smartphone 24 outputs the notification.

In an optional, developed exemplary embodiment, the processor 22 is configured to also determine a type (identity) of the game animal 32 for the recognized heat signature. To this end, the processor 22 carries out a fully trained identification or else classification algorithm. The latter is trained using a plurality of images (and also heat signatures) of wild animals in different views. In this case, the processor 22 also concomitantly outputs the type of game animal 32—a deer in this case—within the scope of the notification (cf. FIG. 2, rectangular ID box 40 next to the marker 36).

In a further exemplary embodiment, likewise depicted on the basis of FIG. 2, the processor 22 is configured to output the notification only if the identified game animal 32 can be assigned to a type of game specified on the part of the user. For example, the person hunting may specify the type of game that should be reported, for example only hoofed game. In this case, the processor 22 would not output a notification if for example "fox" is output as the result of the classification algorithm for the game animal 32.

In a further exemplary embodiment, likewise depicted on the basis of FIG. 2, the observation system 20, in this case specifically the tripod 38 (forming a support platform), includes a base 42 that can be pivoted by an electric motor. This base is control-connected to the processor 22 and serves to pan the thermal imaging device 1 during intended operation and upon instruction by the processor 22, with the result that the observable region can be enlarged beyond the image field 26. Thus, as it were, the thermal imaging device 1 can be used to scan the surroundings of the person hunting.

In a further exemplary embodiment, the observation system 20 includes an additional sensor 44. The latter is "set up" in the forefield, that is to say in the observation region, by the person hunting. For example, this is a motion sensor, a microphone, or the like. This additional sensor 44 is coupled by radio transmission to the smartphone 24 and transmits an activation signal to the latter. Upon reception of the activation signal, the smartphone 24, specifically its processor 22, carries out the aforementioned analysis of the image stream. This can save energy. However, the activation signal may alternatively also be used to specify an image region of the image field 26, within which the processor 22 performs the analysis. This is helpful, especially if a plurality of such additional sensors 44 are used.

In a further exemplary embodiment, the processor 22 is also configured to still track the identified game animal 32 even after a shot has been fired, in order to recognize the escape direction or the escape route of said animal. By way of example, before a shot is fired (especially in the case of several game animals), the person can mark on the display 34 the game animal 32 intended to be shot (for example, by tapping on the touch-sensitive display 34). In the case of the electric motor-driven base 42, the processor 22 can also allow the thermal imaging device 1 to "follow" the fleeing game animal 32 in order to track the latter.

The subject matter of the disclosure is not restricted to the exemplary embodiments described hereinabove. Rather, further embodiments of the disclosure can be derived by a person skilled in the art from the description hereinabove. In particular, the individual features of the disclosure described on the basis of the various exemplary embodiments and the design variants thereof may also be combined with one another in a different way.

LIST OF REFERENCE NUMERALS

1 Thermal imaging device
2 Housing
4 Optical unit
6 Transillumination direction
8 Image detector
10 Controller
12 Display
14 Eyepiece
20 Observation system
22 Processor
24 Smartphone
26 Image field
28 Radio connection
30 Image
32 Game animal
34 Display
36 Marker
38 Tripod
40 ID box
42 Base
44 Additional sensor

What is claimed is:

1. An electro-optical observation system for hunting, the electro-optical observation system comprising:
   a thermal imaging device comprising:
      an electronic image detector; and
      an optical unit assigned to the image detector; and
   a smart mobile device arranged separate from and in data communication with the thermal imaging device, the smart mobile device comprising:
   a user interface; and
   a processor configured to:
      indirectly or directly exchange data with the electronic image detector,
      analyze an image stream acquired with the electronic image detector to determine a presence of an object that is different from an image background,
      control the user interface to output a notification to a user in the case of the presence of the object determined with the electronic image detector, and
      acquire a piece of information about a shot taken at the object and track a possible movement of the object, at least within the image field, and to output the piece of information as a retrieval notification.

2. The electro-optical observation system as claimed in claim 1,
   wherein the processor is further configured to infer the presence of the object when a movement detected for the object is sufficiently different from an approximately static image background.

3. The electro-optical observation system as claimed in claim 1,
   wherein the image detector and the optical unit are part of a thermal imaging device for hunting,
   wherein the image detector is configured as a microbolometer, and
   wherein the processor is configured to infer the presence of the object when the object is assigned a heat signature typical for a game animal.

4. The electro-optical observation system as claimed in claim 1,
   wherein the processor is further configured to output, within the scope of the notification, a piece of information about a localization of the object within the image field.

5. The electro-optical observation system as claimed in claim 1, wherein the processor is further configured to perform an identification of the object.

6. The electro-optical observation system as claimed in claim 5,
   wherein the processor is further configured to perform the identification with a pattern comparison or a trained algorithm.

7. The electro-optical observation system as claimed in claim 5, wherein the processor is further configured to output, within the scope of the notification, a piece of information about the identity of the object.

8. The electro-optical observation system as claimed in claim 5, wherein the processor is further configured to control the user interface to output the notification to the user only when the object corresponds to a type of objects, or a type of game, specified by the user.

9. The electro-optical observation system as claimed in claim 1, further comprising:

at least one additional sensor configured to acquire a measured quantity indicating the presence of a game animal representing the object and which, during intended operation, is configured to activate the analysis for transmitting the measured quantity or an activation signal based on the measured quantity to the processor and/or to a device including the image detector and the optical unit.

10. The electro-optical observation system as claimed in claim 1, wherein the optical unit is configured as a wide-field optical unit.

11. The electro-optical observation system as claimed in claim 1, wherein the optical unit and the image detector are matched to one another such that, in the case of an image depth corresponding to a typical range during hunting, an image with structures that are optically distinguishable in respect of usual game animals to be hunted is imaged on the image detector.

12. The electro-optical observation system as claimed in claim 1, further comprising:

a support platform for mounting a device including the image detector and the optical unit, wherein the support platform is configured, during operation, to impress a panning movement on the device, under processor control, to be able to analyze a region of interest going beyond the image field of the optical unit in respect of the presence of the object.

\* \* \* \* \*